April 1, 1958     T. EDER     2,828,861
SEPARATOR
Filed July 2, 1956
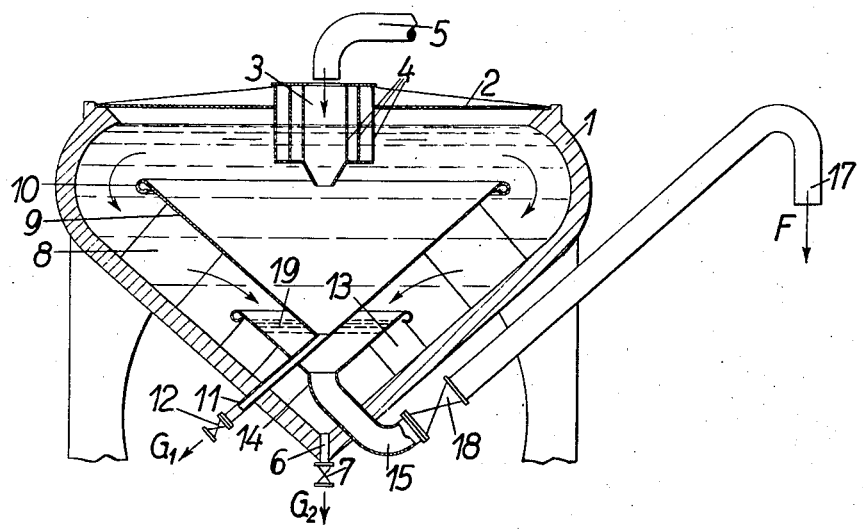
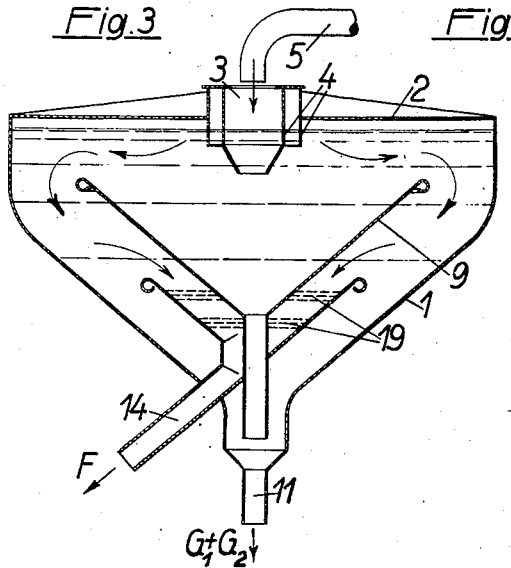
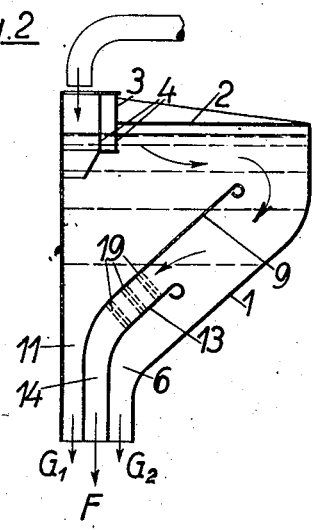
INVENTOR.
BY United States Patent Office 2,828,861
Patented Apr. 1, 1958

2,828,861
SEPARATOR

Theodor Eder, Vienna, Austria

Application July 2, 1956, Serial No. 595,165

Claims priority, application Austria July 9, 1955

5 Claims. (Cl. 209—208)

The invention relates to apparatus for separating the dispersed phase out of a disperse system, particularly out of suspensions, emulsions or the like, e. g. for concentrating granular material suspended in liquids. In the processing of suspended granular material the separation of liquid and solids is a recurring problem. In many cases, particularly when the solids are of considerable value or in certain fields of industry, e. g. in the porcelain industry, that separation must be as complete as possible and entire content of solids exceeding a certain size must be recovered.

To carry out this problem in practice, horizontal sedimentation is often adopted, which is performed in a horizontal sedimentation vessel or concentrator. In most cases these vessels have the shape of conical troughs up to 15 meters in maximum diameter and for this reason occupy a relatively large floor space. The raw feed is supplied at the center of the surface, the sediment is withdrawn at the small end of the cone and the fines flow over at the periphery of the trough. If the overall height is reduced by dispensing with the automatical discharge of the separated sediment, cone surfaces having a larger aperture angle may be used. In that case, however, the sediment must be moved to a discharge point in the axis of the cone by mechanical means, e. g. by a rabbling mechanism. Since the separation is effected in dependence on the final velocity of fall of the subsiding particles, it is necessary in all cases to give most careful consideration to the flow conditions prevailing in the liquid so as to ensure the maintenance of laminar flow and a symmetric flow pattern. It is apparent that great difficulties, which cannot be overcome with reasonable expenditure, are involved in levelling the rim of a trough of, e. g., 10 meters in diameter to an accuracy of a few tenths of a millimeter and in maintaining it permanently in that position. An uneven overflow, however, impairs the uniformity of the flow pattern and deprives considerable parts of the overall area available of their effectiveness as sedimentation area if there is no overflow at all at certain parts of the rim because there is no liquid flow towards said rim portion and no separation takes place in the dead water areas. Where rabble mechanisms are used the flow is disturbed also by the revolving parts. Whereas it is attempted as a rule to become independent of the precise levelling of the overflow rim by providing a cylindrical wall part attached to the cone wall with holes or serrating it at the level of the liquid surface, these measures fail to give a satisfactory solution to the problem of a uniform circulation. All measures of that kind involve considerable irregularities in the flow pattern close to the rim, in the most valuable sedimentation area, so that an annular area close to the rim will be ineffective as a sedimentation area.

The invention overcomes these difficulties in apparatus comprising a downwardly tapering trough having an inclined wall and adapted to contain a body of liquid, and feed means for supplying feed material to a surface layer of said body of liquid by the provision of a guiding and settling surface member extending in said body of liquid below the level thereof and spaced from said inclined wall, and an upper fraction outlet disposed between said surface member and said inclined wall. That guiding and settling surface member may extend substantially parallel to the trough wall or to a part of said wall.

With that arrangement the function of an apparatus according to the invention is completely changed from that of the known concentrators. There is no overflow of fines over an overflow rim so that all difficulties connected therewith are eliminated. The additional guiding and settling surface member deflects the flow out of its initially horizontal direction into a direction which is locally parallel to the lines of dip of the trough wall, without impairing the laminar character of the flow. Separation of solids from the feed suspension charged will take place both in the horizontal and subsiding flow portions. Under such conditions the entire horizontal projection of the guiding and settling surface member and the horizontal projection of the inclined trough wall will be effective as sedimentation area, excepting the negligible portion which lies under the fines outlet. Whereas distributing inserts in the form of apertured partitions or screens have been used for a long time at the feed inlet and fines outlet in order to prevent the formation of large eddies in the sedimentation space, said means do not have a perfect effect. On the contrary, as has been stated hereinbefore, a zone filled with small eddies must be expected close to the inlet and outlet openings. These zones extend over that distance after which the small eddies have been consumed by the internal friction of the liquid. In the arrangement according to the invention that zone is restricted to a relatively worthless, small area, particularly where conical troughs are employed, whereas the valuable rim zone of the sedimentation trough is fully available for the separation.

Three illustrative embodiments of the invention are shown diagrammatically in the drawing, in which Fig. 1 is a sectional view of a concentrator having a conical trough and Figs. 2 and 3 are sectional views of concentrators having a prismatic trough.

A conical sedimentation trough 1 (Fig. 1), which consists, e. g., of reinforced concrete, is closed at the top by a cover 2, which carries at its center an inlet 3 having apertured side walls 4. A pipe 5 serves to feed the raw suspension. An outlet 6 for the coarses is disposed at the small lower end of the trough and provided with a valve 7. The sedimentation trough 1 contains an upwardly open insert cone 9 forming an additional guiding and settling surface member. The insert 9 is carried by ribs 8 of sheet metal or concrete, which serve at the same time as baffles for the liquid flow. The upper rim 10 of that insert cone is turned in to avoid a formation of eddies at a sharp edge. The small end of the insert cone has connected thereto an outwardly extending pipe 11, which may be closed by a valve 12 of the seated or slide valve type. A fines outlet is appropriately spaced below the insert 9 and coaxial therewith. The fines outlet has the form of a funnel and comprises an open-topped cone shell 13 and a lower connection pipe 14, to which a pipeline 15 is connected. The latter extends outwardly through the trough wall and then upwardly and terminates in a bend 17. A valve 18 permits of opening or closing the line 15 as required. Apertured plates 19 are inserted in the cone shell 13.

A second embodiment is shown merely diagrammatically in Fig. 2. It differs from the concentrator described by the different geometrical form of the sedimentation vessel, to which the form of all other essential parts is adapted. In this case the sedimentation trough 1 is a substantially prismatic vessel, which has four vertical side walls and an inclined bottom and which can be closed by a cover 2. The inlet 3 having apertured walls 4 is arranged at the upper part of the elevated rectangular side wall and extends throughout the length of the trough. The raw feed suspension is supplied through a pipe 5. The small end of the sedimentation vessel has an outlet 6 for the coarses settling on the trough wall. An additional guiding and settling surface member 9, which is flat in this case, is disposed inside the sedimentation trough 1 below the level to which the liquid adjusts during operation. That surface 9 extends preferably parallel to the inclined bottom wall of the trough. The angle space included by the guiding and settling surface 9 and one of the rectangular trough walls opens into a shaft 11, through which the coarses settling on the inclined surface member 9 can be discharged. A partition 13 is disposed below the guiding and settling surface member to confine the fines outlet, which is continued by an outlet shaft 14. Screen walls 19 promote a non-turbulent outflow of the fines suspension. Pipelines (not shown) provided with valves are connected to the coarses outlet 6, the shaft 11 and the outlet shaft 14.

A third embodiment illustrated in Fig. 3 results when the apparatus just described is combined with an arrangement which is substantially symmetrical thereto. It is believed that the drawing is self-explanatory without requiring further description.

The method of operation of all apparatus is quite similar. The coarsest solids of the raw feed supplied to the inlet 3 subside through the lower opening thereof directly into the space delimited by the guiding and settling surface member. The liquid laden with the finer solids passes through the apertured side walls 4 approximately into the surface layer of the liquid and flows first horizontally. During that horizontal flow the separation proper begins and additional solids subside onto the guiding and settling surface member. The liquid contained in the space delimited by said surface is outside that liquid flow and remains substantially at rest so that the eddies formed by the subsiding of the coarsest solids do not enter the separating current to destroy the laminar character thereof. The flow is subsequently diverted around the preferably rounded edge of the guiding and settling surface member and turns downwardly towards the fines outlet. During that phase further solids settle down onto the inclined bottom of the sedimentation trough. Guide walls arranged radially or parallel to the trapezoidal side walls of the apparatus shown in Fig. 2 may promote the maintenance of laminar flow conditions and may also be used to support the guiding and settling surface member. The coarse fractions $G_1$ and $G_2$ and the fines are taken from the respective outlets. If it is not desired to separate the two coarse fractions the two outlets may be combined within the trough to form a common coarse outlet. It is apparent that an apparatus equipped according to the invention has almost twice the sedimentation area of one of the usual plants requiring the same floor space.

An example may be described to illustrate the effectiveness of apparatus according to the invention. A conventional conical concentrator with overflow rim (I) and a conical concentrator constructed according to the invention (II), were supplied with raw suspension at rate of 14 cubic meters per hour, containing 400 kg. of fine sand.

| Grain diameter in mm. | Sieve Analysis of the Fine Sand | | | | | |
|---|---|---|---|---|---|---|
| | 0.25 | 0.15–0.25 | 0.1–0.15 | 0.06–0.1 | 0.04–0.06 | 0.04 |
| Percentage contained in fine sand | 1 | 8 | 12 | 22 | 17 | 40 |

Each of the two concentrators I and II was 2 meters in diameter. The fines overflow from the two vessels was subjected to an analysis, the results of which are shown in the following tables:

| Grain diameter in mm. | 0.1 | 0.06–0.1 | 0.04–0.06 | 0.04 |
|---|---|---|---|---|
| Percentage contained in Fines I | 1 | 4 | 12 | 83 |
| Percentage contained in Fines II | 0 | 0.5 | 3.5 | 96 |

The total amounts of solids discharged per hour were 100 kg. of fines I and 55 kg. of fines II.

It is obvious from the table that the construction of a concentrator according to the invention will lower the critical grain size. This fact is important in cases where the fines must not contain any coarse particles, as is required, e. g., in the porcelain industry.

Finally it may be mentioned that the apparatus according to the invention, whose use and function has been explained with reference to the separation of suspended granular material, may be used with the same success and without any changes for the separation of liquid droplets out of emulsions.

In the foregoing specification and the appended claims the term "upper fraction" describes a fraction adapted to float in the liquid contained in the trough, e. g. the fine fraction of a suspension of solid particles, and the term "lower fraction" describes a fraction adapted to subside in said liquid, e. g. a coarse fraction of a suspension of solids.

I claim:

1. Apparatus for separating a dispersed phase out of a disperse system, comprising a downwardly tapering trough having an inclined wall and a lower fraction outlet and adapted to contain a body of liquid, means for closing said lower fraction outlet, feed means for supplying feed material to a surface layer of said body of liquid and producing substantially laminar flow conditions in said surface layer, a guiding and settling surface member having a substantially horizontal free upper edge, which is arranged to be submerged in said body of liquid, said surface member being spaced from said inclined wall, and an upper fraction outlet disposed between said surface member and said inclined wall to cause a downwardly directed, substantially laminar current to flow between said surface member and said inclined wall to said upper fraction outlet.

2. Apparatus for separating a dispersed phase out of a disperse system, comprising a downwardly tapering trough having an inclined wall and a lower fraction outlet and adapted to contain a body of liquid, means for closing said lower fraction outlet, feed means for supplying feed material to a surface layer of said body of liquid and producing substantially laminar flow conditions in said surface layer, a guiding and settling surface member having a substantially horizontal free upper edge, which is arranged to be submerged in said body of liquid, said surface member being spaced from and extending substantially parallel to said inclined wall, and an upper fraction outlet disposed between said surface member and said inclined wall to cause a downwardly directed, substantially laminar current to flow between said surface member and said inclined wall to said upper fraction outlet.

3. Apparatus for separating a dispersed phase out of a disperse system, comprising a downwardly tapering, radially symmetrical trough having a centrally disposed lower fraction outlet and adapted to contain a body of liquid, means for closing said lower fraction outlet, centrally disposed feed means for supplying feed material to a surface layer of said body of liquid and producing substantially laminar flow conditions in said surface layer, a guiding and settling surface member having a substantially horizontal free upper edge, which is arranged to be submerged in said body of liquid, said surface member being spaced from said inclined wall, and an upper fraction outlet disposed between said surface member and said inclined wall to cause a downwardly directed, substantially laminar current to flow between said surface member and said inclined wall to said upper fraction outlet.

4. Apparatus for separating a dispersed phase out of a disperse system, comprising a downwardly tapering trough having an inclined wall and adapted to contain a body of liquid, feed means for supplying feed material to a surface layer of said body of liquid and producing substantially laminar flow conditions in said surface layer, a guiding and settling surface member having a substantially horizontal free upper edge, which is arranged to be submerged in said body of liquid, said surface member being spaced from said inclined wall, said surface member and inclined wall being arranged to receive separate lower fractions of said feed material supplied by said feed means, separate outlets arranged to discharge said lower fractions separately from said trough, means for closing said separate outlets, and an upper fraction outlet disposed between said surface member and said inclined wall to cause a downwardly directed, substantially laminar current to flow between said surface member and said inclined wall to said upper fraction outlet.

5. Apparatus for separating a dispersed phase out of a disperse system, comprising a downwardly tapering trough having an inclined wall and a lower fraction outlet and adapted to contain a body of liquid, means for closing said lower fraction outlet, feed means for supplying feed material to a surface layer of said body of liquid and producing substanitally laminar flow conditions in said surface layer, a guiding and settling surface member having a substantially horizontal free upper edge, which is arranged to be submerged in said body of liquid, said surface member being spaced from said inclined wall, an upper fraction outlet disposed between said surface member and said inclined wall to cause a downwardly directed, substantially laminar current to flow between said surface member and said inclined wall to said upper fraction outlet, and baffles supporting said surface member on said inclined wall and arranged to guide said current.

References Cited in the file of this patent

UNITED STATES PATENTS 2,426,839    Morris     Sept. 2, 1947

FOREIGN PATENTS 211,148    Great Britain     Jan. 22, 1925